US012802097B2

(12) United States Patent
Di Giovanni et al.

(10) Patent No.: US 12,802,097 B2
(45) Date of Patent: Nov. 17, 2026

(54) SYSTEM AND METHOD FOR THE LIVE STREAMING OF MARKETING EVENTS

(71) Applicant: SUMMIT-TECH MULTIMEDIA COMMUNICATIONS INC., Montreal (CA)

(72) Inventors: Alido Di Giovanni, Montreal (CA); Ah-mad (safa) Vakili, Montreal (CA)

(73) Assignee: SUMMIT-TECH MULTIMEDIA COMMUNICATIONS INC.

( * ) Notice: Subject to any disclaimer, the term of this patent is extended or adjusted under 35 U.S.C. 154(b) by 0 days.

(21) Appl. No.: 18/570,526

(22) PCT Filed: Jun. 15, 2022

(86) PCT No.: PCT/CA2022/050960
§ 371 (c)(1),
(2) Date: Dec. 14, 2023

(87) PCT Pub. No.: WO2022/261769
PCT Pub. Date: Dec. 22, 2022

(65) Prior Publication Data

US 2024/0289836 A1 Aug. 29, 2024

Related U.S. Application Data

(60) Provisional application No. 63/210,791, filed on Jun. 15, 2021.

(51) Int. Cl.
*G06Q 30/0241* (2023.01)
*G06K 19/06* (2006.01)
(Continued)

(52) U.S. Cl.
CPC ... *G06Q 30/0241* (2013.01); *G06K 19/06037* (2013.01); *H04L 51/02* (2013.01); *H04N 21/2187* (2013.01)

(58) Field of Classification Search
CPC ............. G06Q 30/0241; G06Q 30/015; G06Q 30/0601; G06K 19/06037; H04L 51/02;
(Continued)

(56) References Cited

U.S. PATENT DOCUMENTS 12,106,359 B2 * 10/2024 Shenk .................. G06F 16/955
2012/0030359 A1 * 2/2012 Piernot ............... G06F 16/9566 709/226
(Continued)

OTHER PUBLICATIONS

Kristoff, "How to Create QR Codes that Last Forever". Aug. 17, 2011, www.Kristoffcreative.com. p. 1-7. (Year: 2011).*

*Primary Examiner* — Ilana L Spar
(74) *Attorney, Agent, or Firm* — PRAXIS

(57) ABSTRACT

A system and method for the live streaming of marketing events allowing the viewing of products or services offered/presented and the scanning of associated simplified QR codes. The system and method also provide a chatbot builder platform allowing the creation of a chatbot for viewing and displaying details of the products or services as well as adding them to a shopping cart. It system and method further provide a director platform allowing the administration of the available live streaming marketing events and products or services. There is also provided a system and method of generating a simplified QR code from an original QR code.

7 Claims, 5 Drawing Sheets

(51) Int. Cl.
*H04L 51/02* (2022.01)
*H04N 21/2187* (2011.01)

(58) Field of Classification Search
CPC . H04L 65/403; H04L 65/401; H04N 21/2187; H04N 21/2542; H04N 21/8586
See application file for complete search history.

(56) References Cited

U.S. PATENT DOCUMENTS

| | | | | |
|---|---|---|---|---|
| 2012/0151524 | A1* | 6/2012 | Kilaru | G06Q 30/0241 725/35 |
| 2013/0188095 | A1* | 7/2013 | Hartson | H04N 21/4126 348/589 |
| 2014/0306019 | A1* | 10/2014 | Windmueller | G06F 16/9554 235/494 |
| 2015/0079959 | A1* | 3/2015 | Daudelin | H04M 3/56 455/416 |
| 2016/0155162 | A1* | 6/2016 | Gagnon-Volles | G06Q 30/0605 705/26.2 |
| 2019/0294844 | A1* | 9/2019 | Burkhart | G06K 7/1417 |
| 2022/0270143 | A1* | 8/2022 | Yeiser, IV | G06Q 30/0273 |
| 2022/0284495 | A1* | 9/2022 | Knezi | H04N 21/47815 |
| 2022/0337911 | A1* | 10/2022 | Bayat | H04N 21/812 |

* cited by examiner

SYSTEM AND METHOD FOR THE LIVE STREAMING OF MARKETING EVENTS

CROSS-REFERENCE TO RELATED APPLICATIONS

This application claims the benefits of U.S. provisional patent application No. 63/210,791 filed on Jun. 15, 2021, which is herein incorporated by reference.

TECHNICAL FIELD

The present disclosure relates to system and method for the live streaming of marketing events.

BACKGROUND

Live streaming is used to transmit or receive live video and audio coverage of various events such as sporting events, conferences, religious events, marketing events, etc.

However, there is a need for system and method for live streaming marketing events, or other types of events, allowing simplified interaction between local or remote attendees and the event.

SUMMARY

There is provided a method for live streaming marketing events, comprising the steps of:

proving at least one video feed;

providing at least one display;

providing a live streaming marketing events application having attendee and presenter functionalities;

the presenter functionalities allowing a presenter to display at least one simplified QR code associated with at least one displayed product or service, the simplified QR code being based on an original QR code corresponding to the associated at least one displayed product or a service; and the attendee functionalities allowing an attendee to control the camera feed and scan one of the at least one simplified QR code corresponding to a desired displayed product or service;

providing a chatbot allowing the retrieval of details of a product or service corresponding to the scanned simplified QR code, and adding the product or service corresponding to the scanned simplified QR code to a shopping cart;

wherein the details of the product or service corresponding to the scanned simplified QR code are determined using an original .xml feed of the product or service corresponding to the scanned simplified QR code.

There is also provided a method for live streaming marketing events as above, wherein the displayed at least one simplified QR code is generated by:

obtaining an event ID;

generating a dataset containing the original QR code corresponding to the associated at least one displayed product or service and information related to the associated at least one displayed product or service;

storing the dataset in a database;

generating the displayed at least one simplified QR code using the original QR code and the event ID;

generating a dataset look-up table linking the at least one simplified QR code with its corresponding original QR code and information stored in the database.

There is further provided a system for live streaming marketing events, comprising:

at least one camera providing a video feed;

at least one display;

a live streaming marketing events application having attendee and presenter functionalities;

the presenter functionalities allowing a presenter to display at least one simplified QR code associated with at least one displayed product or service, the simplified QR code being based on an original QR code corresponding to the associated at least one displayed product or a service; and the attendee functionalities allowing an attendee to control the camera feed and scan one of the at least one simplified QR code corresponding to a desired displayed product or service;

a chatbot allowing the retrieval of details of a product or service corresponding to the scanned simplified QR code, and adding the product or service corresponding to the scanned simplified QR code to a shopping cart;

wherein the details of the product or service corresponding to the scanned simplified QR code are determined using an original .xml feed of the the product or service corresponding to the scanned simplified QR code.

There is further provided system for live streaming marketing events as above, further comprising a database and wherein the displayed at least one simplified QR code is generated by:

obtaining an event ID;

generating a dataset containing the original QR code corresponding to the associated at least one displayed product or service and information related to the associated at least one displayed product or service in the database;

generating the displayed at least one simplified QR code using the original QR code and the event ID;

generating a dataset look-up table linking the at least one simplified QR code with its corresponding original QR code and information in the database.

In the method and system for live streaming marketing events disclosed above, the attendee functionalities can be provided via a communication device such as a smart phone, a smart tablet and a smart TV. The communication device may be provided with, for example, Virtualized Function, Multi-access Edge Computing and a Subscriber Identification Module.

There is also provided a method of generating a simplified QR code, the method comprising the steps of:

obtaining an original QR code of a selected product or a selected service;

obtaining an event ID;

generating a dataset containing the original QR code and information related to the selected product or the selected service in a database;

generating an associated simplified QR code using the original QR code and the event ID;

generating a dataset look-up table linking the simplified QR code with its corresponding original QR code and information.

There is further provided a system of generating a simplified QR code, comprising:

a database;

at least one processor in communication with an input/output interface and a database, the at least one processor having an associated memory comprising instructions stored thereon that when executed on the at least one processor perform the steps of:

obtaining an original QR code of a selected product or a selected service via the input/output interface;

obtaining an event ID via the input/output interface;

generating a dataset containing the original QR code and information related to the selected product or the selected service;

storing the dataset in the database;

generating an associated simplified QR code using the original QR code and the event ID;

generating a dataset look-up table linking the simplified QR code with its corresponding original QR code and information stored in the database.

BRIEF DESCRIPTION OF THE FIGURES

Embodiments of the disclosure will be described by way of examples only with reference to the accompanying drawing, in which.

Similar references used in different Figures denote similar components.

DETAILED DESCRIPTION

Generally stated, the non-limitative illustrative embodiments of the present disclosure provide system and method for live streaming marketing events.

Figure 1:
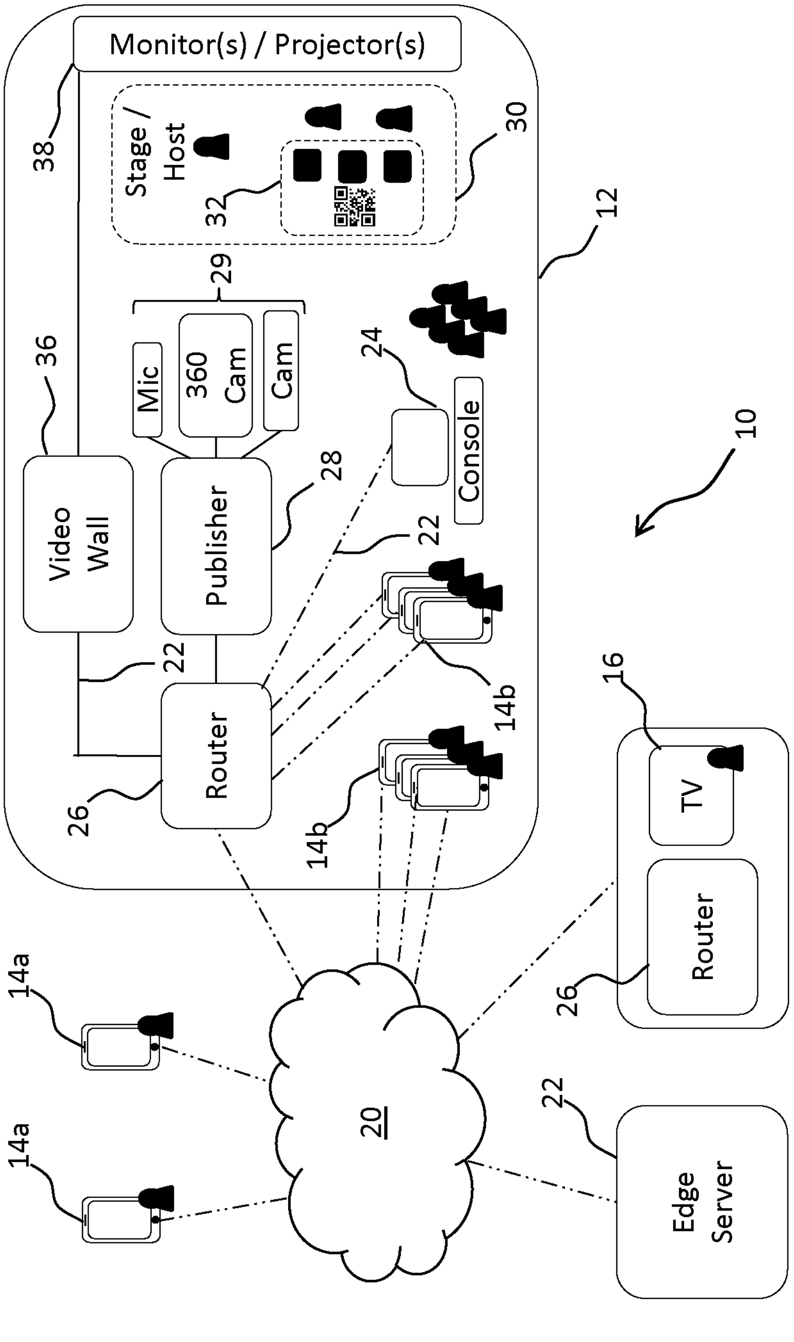
FIG. 1 is a schematic representation of the live streaming marketing events system in accordance with an illustrative embodiment of the present disclosure.

Referring to FIG. 1, the live streaming marketing events system 10, in accordance with an illustrative embodiment of the present disclosure, allows remote attendees with a smart phone/tablet 14*a* or smart TV 16, as well as on-site attendees with a smart phone/tablet 14*b*, to participate in a live marketing event 12.

At the live marketing event 12 location, a stage 30 is provided where a host presents products or services displayed on one or more display surface 32. A set of sensors 29, for example a microphone, camera, 360° camera, panoramic camera, etc., capture the proceedings of the live marketing event 12, which are then projected on the video wall 36 and provided to the remote 14*a*, 16 and on-site 14*b* attendees, of which some or all are displayed on the monitor(s)/projector(s) 38, via the publisher 28. A console 24 controls the operations of the live streaming marketing events system 10.

In the illustrative embodiment, the smart phones/tablets 14*a*, 14*b* are provided with Virtualized Function (VF), Multi-access Edge Computing (MEC) and a Subscriber Identification Module (SIM), while the live marketing event 12 and the smart TV 16 use associated routers 26 provided with VF, MEC and SIM.

All communications are provided via WAN 20 and LAN 22, such as, for example, HDMI, Ethernet (broadband, high-speed), wireless WiFi, cable Internet, satellite connection, CDMA, 3G GSM, 4G LTE, 5G NR, or other cellular/mobile network, etc., or a combination thereof.

The remote and on-site attendees interact with the live marketing event 12 through their respective smart phones/tablets 14*a*, 14*b* and smart TV 16 provided with the live streaming marketing events application. The live streaming marketing events application allows the attendees to hear and visualize the live marketing event 12 through the set of sensors 29 with the 360° camera allowing them to control the viewing direction, and in particular to view the one or more display surface 32.

Figure 2:
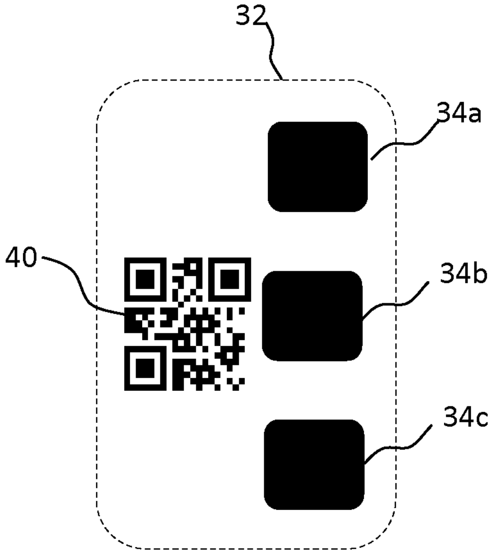
FIG. 2 is a schematic representation of a display surface in accordance with the illustrative embodiment of the present disclosure.

With reference to FIG. 2, the one or more display surface 32 includes a number of display areas 34*a*, 34*b*, 34*c* for displaying products or services and one or more Quick Response (QR) code display 40. In the illustrative embodiment, the QR code display 40 is dynamic, for example a tablet or other such digital display device, and displays a simplified QR code corresponding to one of the displayed products or services being referred to by the host, the console 24 being used to display the appropriate simplified QR code on the QR code display 40. In an alternative embodiment, each of the display areas 34*a*, 34*b*, 34*c* may have an associated QR code display 40. In a further alternative embodiment, QR code display 40 may be static, for example a physical printout, one for each of the display areas 34*a*, 34*b*, 34*c* or a single one for the group.

In use, the attendees, using the live streaming marketing events application on their respective smart phones/tablets 14*a*, 14*b* and smart TV 16, manipulate their view of the live marketing event 12 through the set of sensors 29, for example the 360° camera. Whenever a QR code display 40 is in the field of view, the live streaming marketing events application allows the attendee to select it and activate the associated link on the edge server 22, for example an Amazon Web Services (AWS) server with the live streaming marketing events application.

The live streaming marketing events application on the edge server 22 provides simplified xml feeds including simplified products or services and IDs (from the original products or services provided by the merchants). These simplifications allow the use of correspondingly simplified QR codes.

Being that every live stream marketing event is provided using a unique Uniform Resource Locator (URL), the live streaming marketing events method and system uses the stream URL and/or stream ID, and a simple string (a small set of numbers of characters) to co-relate to the original product/service dataset.

The stream ID is a small set of characters, e.g. 8R9TTu, +a number starting at 1, and incrementing by 1 to reflect the number of unique QR codes in the actual stream (being it is a video of limited length, it would be expected to be in quantities below 1000). The small set of characters within the video stream is associated with the original QR code dataset.

For example, if a QR code dataset is very large, the data in the QR code is 100 characters long, as opposed to a limited number of characters, for example, three characters long in the case of the simplified QR code in accordance with the illustrative embodiment. The QR code itself is composed of many small squares, making it more challenging to read at a distance, which is especially an issue when the QR code is being detected and decoded from a limited resolution video source/display. To overcome this, the live streaming marketing events method and system associates the original dataset to a simplified dataset, which generates a simplified QR code composed of larger squares more readily read at a distance and/or through limited resolution video source/display. In short, the simplified QR code simply points to an entry where the decoded original QR code information is stored.

It is to be understood that the number of products/services (e.g., web address or AWS services etc.) at live marketing event 12 is limited by the number of available simplified QR codes, the simplified QR code representing a number or ID which points to that event's real (i.e. full) QR codes stored decoded original QR code information dataset.

In use, the live streaming marketing events application allows the viewing of available live streaming marketing events, to view the products or services offered/presented and to scan associated simplified QR codes. It also provides a chatbot builder platform allowing the creation of a chatbot for viewing and displaying details of the products or services as well as add them to a shopping cart. It further provides a director platform allowing the administration of the available live streaming marketing events and products or services.

The chatbot builder platform uses the original products or services .xml feeds to make the products or services available through the chatbot. In doing so, it automatically creates a new simplified .xml feed with a corresponding simplified ID and QR code. The simplified ID comprises a lesser number of characters and thus a simplified QR code, which allows its identification from a greater distance via the live streaming marketing event camera 29 than a more complex QR code.

The simplified QR code dataset is stored in a database that is accessible by the components of the live streaming marketing events system 10, such as the remote 14*a*, 16 and on-site 14*b* attendees, chatbot, etc., and receive the full information of the original QR codes.

Figures 3A, 3B, 3C, 4A, 4B, 4C:
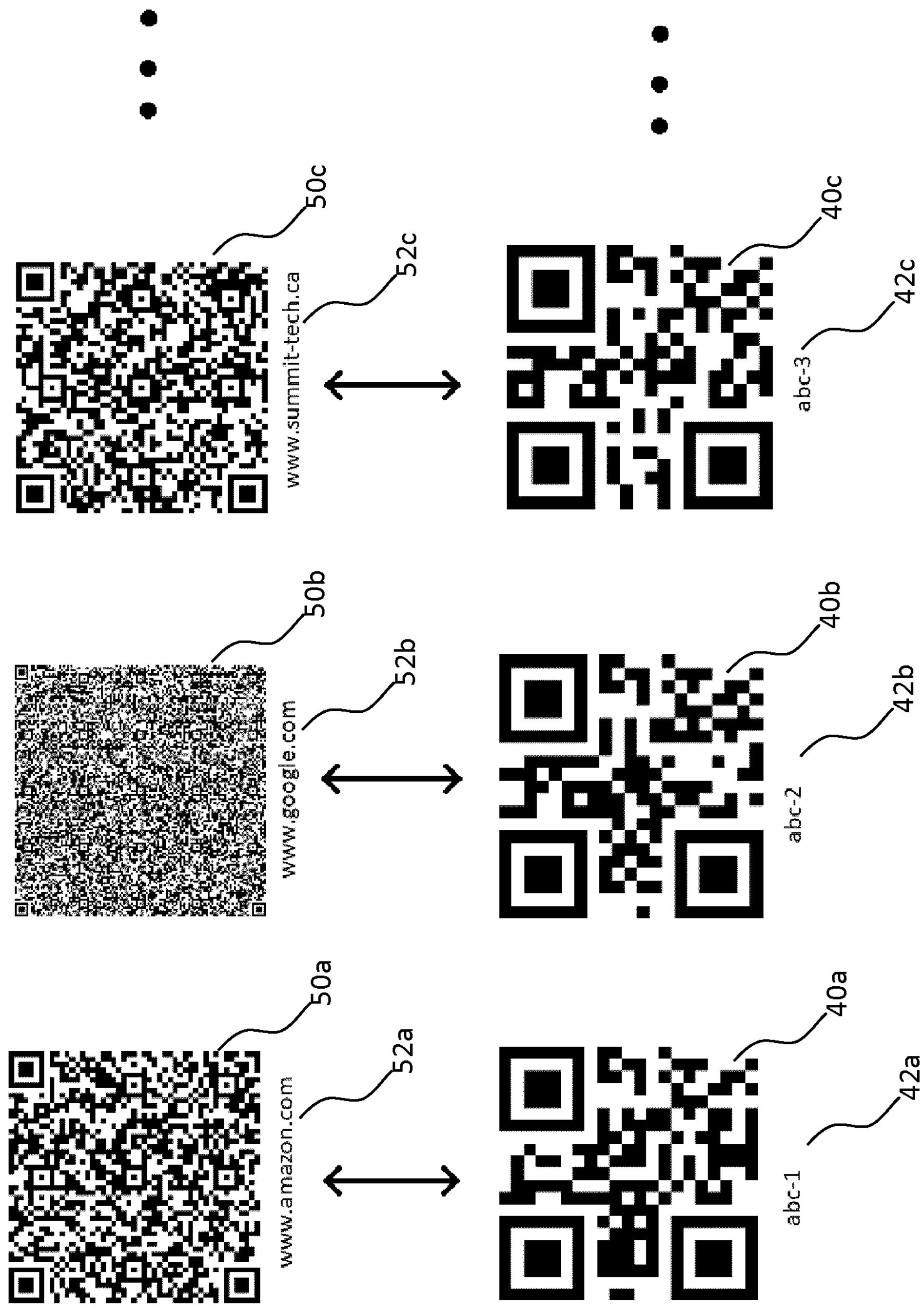
FIGS. 3A, 3B and 3C are examples of simplified QR codes in accordance with the illustrative embodiment of the present disclosure.
FIGS. 4A, 4B and 4C are regular QR codes corresponding to the simplified QR Codes of FIGS. 4A, 4B and 4C, respectively.

Referring to FIGS. 3A, 3B and 3C, there are shown examples of simplified QR codes, in accordance with the illustrative embodiment of the present disclosure, with their respective associated regular QR codes shown in FIGS. 4A, 4B and 4C. Each original QR code 50*a*, 50*b* and 50*c* relates to a product or service from an associated external reference 52*a*, 52*b* and 52*c*. As for the corresponding simplified QR codes 40*a*, 40*b* and 40*c*, they are comprised of a reduced set of squares identifying an event-related reference 42*a*, 42*b* and 42*c* from a local dataset.

Figure 5:
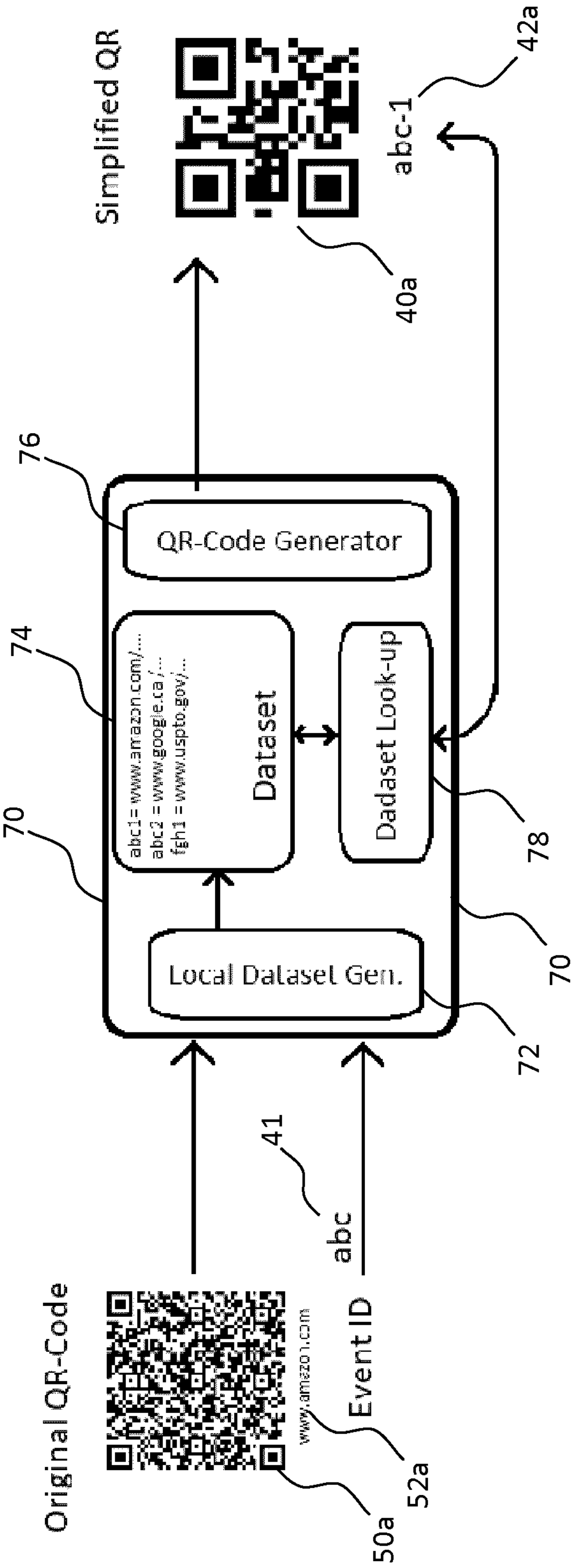
FIG. 5 is a schematic representation of the simplified QR code generation process in accordance with the illustrative embodiment of the present disclosure.

Referring now to FIG. 5, the simplified QR code generation process 70 in accordance with the illustrative embodiment of the present disclosure. The original QR code 50*a* and event ID 41 are provided to the local dataset generator 72 that generates a dataset 74 containing the original QR code information in a database. From this original QR code 50*a* and the event ID 41, the QR code generator 76 generates an associated simplified QR code 40*a* and a dataset look-up table 78 that links the simplified QR code 40*a* with its corresponding original QR code and its information. The dataset look-up module 78 is readily accessible in order to provide connection through the original QR code.

Figure 6:
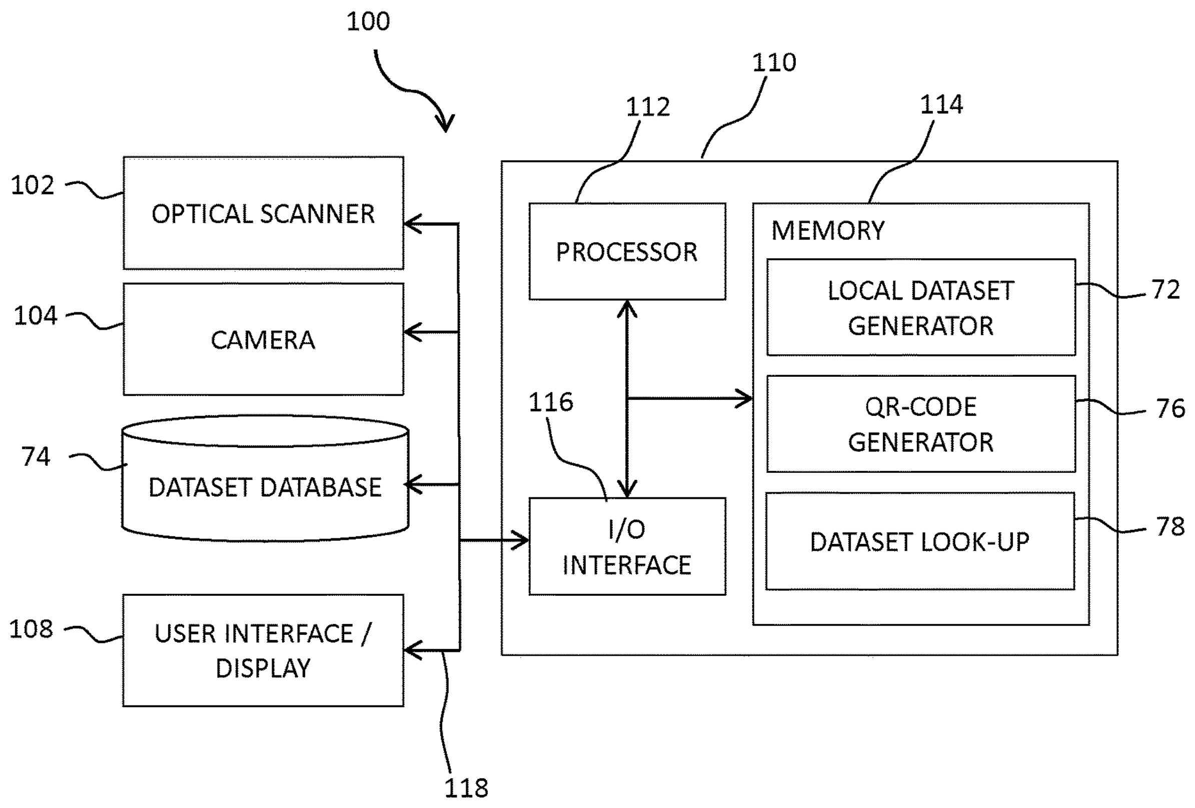
FIG. 6 is a schematic representation of the simplified QR code generation system in accordance with the illustrative embodiment of the present disclosure.

It is to be understood that although the simplified QR code generation process 70 is part of the live streaming marketing events system 10, it can also be used separately in order to provide simplified QR codes for other purposes. Accordingly, FIG. 6 shows a simplified QR code generation system 100 that includes a computing device 110 having one or more processor 112 with an associated memory 114 having stored therein processor executable instructions for configuring the one or more processor 112 to perform local dataset generator 72, the QR code generator 76 and the dataset look-up 78 processes. The simplified QR code generation system 100 further includes an input/output (I/O) interface 116 for communication with one or more optical scanner 102, camera 104 and/or any other device for inputting a QR code, a dataset database 74 and a user interface/display 108 through communication link 118, which may be wired, wireless or a combination of both. The generated simplified QR codes can be provided to the user interface/display 108 and/or to any other system/process via the communication link 118

It is to be understood that although reference is made to marketing events throughout the present disclosure, it is to be understood that the disclosed system and method can be used for other events to allow interaction and access to presented products or services, or to obtain complimentary information on topics included in the event, i.e. simplified QR giving access to sports team statistics, travel packages to discussed locations, etc.

Although the present disclosure has been described with a certain degree of particularity and by way of an illustrative embodiments and examples thereof, it is to be understood that the present disclosure is not limited to the features of the embodiments described and illustrated herein but includes all variations and modifications within the scope of the disclosure.

What is claimed is:

1. A method for live streaming marketing events, comprising the steps of:

providing at least one video feed;

providing at least one display;

providing a live streaming marketing events application having attendee and presenter functionalities;

the presenter functionalities allowing a presenter to display at least one simplified Quick Response (QR) code associated with at least one displayed product or service, the simplified QR code being based on an original QR code corresponding to the associated at least one displayed product or a service; and the attendee functionalities allowing an attendee to control a camera feed and scan one of the at least one simplified QR code corresponding to a desired displayed product or service;

providing a chatbot allowing retrieval of details of a product or service corresponding to the scanned simplified QR code, and adding the product or service corresponding to the scanned simplified QR code to a shopping cart;

wherein the details of the product or service corresponding to the scanned simplified QR code are determined using an original .xml feed of the product or service corresponding to the scanned simplified QR code, and wherein simplified QR code is generated by:

obtaining an event Identification (ID);

generating a dataset containing the original QR code corresponding to the associated at least one displayed product or service and information related to the associated at least one displayed product or service;

storing the dataset in a database;

generating the displayed at least one simplified QR code using the original QR code and the event ID; and generating a dataset look-up table linking the at least one simplified QR code with its corresponding original QR code and information stored in the database.

2. A method for live streaming marketing events in accordance with claim 1, wherein the attendee functionalities are provided via a communication device selected from the group consisting of a smart phone, a smart tablet and a smart TV.

3. A method for live streaming marketing events in accordance with claim 2, wherein the communication device is provided with Virtualized Function, Multi-access Edge Computing and a Subscriber Identification Module.

4. A system for live streaming marketing events, comprising:

at least one camera providing a video feed;

at least one display;

a live streaming marketing events application having attendee and presenter functionalities;

the presenter functionalities allowing a presenter to display at least one simplified Quick Response (QR) code associated with at least one displayed product or service, the simplified QR code being based on an original QR code corresponding to the associated at least one displayed product or a service; and the attendee functionalities allowing an attendee to control a camera feed and scan one of the at least one simplified QR code corresponding to a desired displayed product or service;

a chatbot allowing retrieval of details of a product or service corresponding to the scanned simplified QR code, and adding the product or service corresponding to the scanned simplified QR code to a shopping cart;

wherein the details of the product or service corresponding to the scanned simplified QR code are determined using an original .xml feed of the product or service corresponding to the scanned simplified QR code.

5. A system for live streaming marketing events in accordance with claim 4, further comprising a database and wherein the displayed at least one simplified QR code is generated by:

obtaining an event Identification (ID);

generating a dataset containing the original QR code corresponding to the associated at least one displayed product or service and information related to the associated at least one displayed product or service in the database;

generating the displayed at least one simplified QR code using the original QR code and the event ID;

generating a dataset look-up table linking the at least one simplified QR code with its corresponding original QR code and information in the database.

6. A system for live streaming marketing events in accordance with claim 4, wherein the attendee functionalities are provided via a communication device selected from the group consisting of a smart phone, a smart tablet and a smart TV.

7. A system for live streaming marketing events in accordance with claim 6, wherein the communication device is provided with Virtualized Function, Multi-access Edge Computing and a Subscriber Identification Module.

* * * * *